United States Patent [19]

Terada et al.

[11] Patent Number: 5,039,457

[45] Date of Patent: * Aug. 13, 1991

[54] MULTIFILAMENT TYPE PLASTIC OPTICAL FIBER AND PROCESS FOR PREPARATION THEREOF

[75] Inventors: Hiromu Terada; Kenichi Sakunaga, both of Otake; Naoyuki Fukahori, Ayase, all of Japan

[73] Assignee: Mitsubishi Rayon Company Ltd., Tokyo, Japan

[*] Notice: The portion of the term of this patent subsequent to Mar. 22, 2005 has been disclaimed.

[21] Appl. No.: 320,505

[22] Filed: Mar. 8, 1989

Related U.S. Application Data

[62] Division of Ser. No. 61,346, Jun. 15, 1987, Pat. No. 4,842,365.

[30] Foreign Application Priority Data

Jun. 20, 1986 [JP] Japan ................. 61-144456
Jul. 25, 1986 [JP] Japan ................. 61-114442
Sep. 22, 1986 [JP] Japan ................. 61-221781

[51] Int. Cl.$^5$ .............................. D01F 8/04
[52] U.S. Cl. ......................... 264/1.5; 264/1.6; 264/171; 264/177.1; 264/177.13; 264/210.8
[58] Field of Search ............. 264/1.5, 1.6, 171, 103, 264/210.8, 177.1, 177.13; 425/131.5, 133.1

[56] References Cited

U.S. PATENT DOCUMENTS

| | | | |
|---|---|---|---|
| 3,556,635 | 1/1971 | Schrenk et al. | 350/96.24 |
| 4,352,550 | 10/1982 | Uchida | 350/96.24 |
| 4,564,261 | 1/1986 | Kojima et al. | 350/96.24 |
| 4,690,500 | 9/1987 | Hayami et al. | 350/96.24 |
| 4,732,716 | 3/1988 | Sakunaga et al. | 264/171 |

FOREIGN PATENT DOCUMENTS

| | | |
|---|---|---|
| 0207705 | 1/1985 | European Pat. Off. . |
| 0131058 | 1/1987 | European Pat. Off. . |
| 1037498 | 7/1966 | United Kingdom . |

Primary Examiner—Hubert C. Lorin
Attorney, Agent, or Firm—Oblon, Spivak, McClelland, Maier & Neustadt

[57] ABSTRACT

A multifilament type plastic optical fiber having a substantially rectangular cross-section and an islands-in-the-sea structure in which 100 to 10,000 islands are arranged in the sea, wherein the respective islands have a substantially circular cross-section and a core-sheath structure, the islands are arranged in a zigzag-stacked structure, the core occupancy ratio in the multifilament type optical fiber cores section is at least 50% and the brightness index value I which is defined by the following (1), is at least $4.5 \times 10^{-2}$:

$$I = S \cdot NA^2 \cdot 10^{-(\frac{aL}{10})} \qquad (1)$$

wherein S stands for the core occupancy ratio in the multifilament type optical fiber, α stands for the transmission loss (dB/m) per meter of the multifilament type optical fiber, NA stands for the numeral apertures, and L stands for the length (m) of the used optical fiber.

6 Claims, 3 Drawing Sheets

MULTIFILAMENT TYPE PLASTIC OPTICAL FIBER AND PROCESS FOR PREPARATION THEREOF

This is a division of application Ser. No. 07/061,346, filed June 15, 1987, now U.S. Pat. No. 4,842,365.

BACKGROUND OF THE INVENTION

1. Field of the Invention

The present invention relates to an islands-in-the-sea structure multifilament type plastic optical fiber having light transmitting islands as large as 100 to 10,000, which is characterized in that the light transmitted by this optical fiber is much brighter than the light transmitted by a multifilament type silica optical fiber, and a process for the preparation thereof.

2. Description of the Related Art

A multifilament type optical fiber comprising silica optical filaments having a diameter smaller than 200 $\mu$, which are arranged at a high degree of orientation, is capable of transmitting an image by light and is used as a fiber scope represented by a stomach camera, mainly in the field of medical instruments.

In the multifilament type silica optical fiber, the diameter of individual filaments can be made smaller than in the plastic type optical fiber, and therefore, development of a multifilament type silica optical fiber having an image element number as large as 10,000 or more has been advanced. However, this multifilament type optical fiber is seriously defective in that, since the fineness is very small and the resistance to bending is very low, the silica optical fiber is relatively easily broken by a bending operation during use and the broken part of the optical fiber causes an image defect.

Moreover, because of the properties of silica glass, the multifilament type optical fiber formed of silica optical filaments is inevitably rigid, and when the multifilament type optical fiber is used as an image scope, it is difficult to increase the bending angle, and thus the visual field that can be inspected is narrow.

Accordingly, development of a multifilament type plastic optical fiber comprising arranged many plastic optical filaments, which is not easily broken and can be bent more easily than the multifilament type silica optical fiber, has been attempted. For example, such attempts are disclosed in U.S. Pat. No. 3,556,635, Japanese Unexamined Patent Publication No. 56-39505, and European Patent No. 0.0207705-A2.

According to the invention disclosed in U.S. Pat. No. 3,356,635, a multifilament type plastic optical fiber is prepared by using an islands-in-the-sea conjugate spinning nozzle having a specific structure shown in the accompanying drawings. The islands-in-the-sea conjugate spinning spinneret used in this invention has a complicated structure such that core-forming pipes are vertically implanted in a sheath-forming orifice plate and sheath-forming pipes are vertically implanted in a sheath-forming orifice plate. Accordingly, dead spaces are formed in the portions of the respective nozzle ends on a sea-forming spinneret, and at the time of conjugate spinning, a hot molten polymer stagnates in these dead spaces and the polymer is thermally deteriorated. Therefore, it is difficult to prepare a multifilament type plastic optical fiber having a good light-transmitting property.

In the cross-section of the multifilament type plastic optical fiber prepared according to the invention disclosed in U.S. Pat. No. 3,556,635, islands exerting the light-transmitting function have a substantially rectangular cross-sectional shape, and these rectangular islands are regularly arranged in the longitudinal and lateral directions in the cross-section of the sea component, and the area occupied by the rectangular islands is less than 40% of the sectional area of the sea component. Accordingly, the multi-filament type optical fiber is defective in that a bright image cannot be transmitted with a good image-transmitting property.

Japanese Unexamined Patent Publication No. 56-39505 discloses an ultrafine multifilament type optical fiber having an islands-in-the-sea structure, and teaches that the number of islands is about 100,000 at largest and the cross-sectional area occupied by the islands is 50 to 98%. As disclosed in this unexamined patent publication, the cross-section of this multi-filament type plastic optical fiber has a circular structures and the cross-section of islands arranged in the central portion of this optical fiber's cross section has a circular structure and the image-transmitting property is good. However, the cross-section structures of the islands arranged in the peripheral portion of the multifilament type optical fiber are tetragonal to polygonal structure and the image-transmitting property of these islands is drastically reduced. Accordingly, the image-transmitting property of the multifilament type plastic optical fiber as a whole is unsatisfactory. This tendency becomes conspicuous as the cross-section structure of the multi-filament type optical fiber becomes close to a true circle and the ratio of the area occupied by the islands in the cross-section of the multifilament type optical fiber is increased, and the image-transmitting property becomes more unsatisfactory.

Accordingly, we previously proposed a process for preparing an excellent multifilament optical fiber in European Patent No. 0207705-A2. In this process, a conjugate spinneret is used for preparing an islands-in-the-sea multifilament type optical fiber, which comprises an orifice plate having many island-forming nozzle holes, which consists of core-forming orifice plate and sheath-forming orifice plate, an orifice plate having a sea-forming nozzle hole and a filament-gathering nozzle hole, wherein the nozzle hole of the orifice plate disposed just above the lowermost orifice plate, which is generally a sea-forming orifice plate, has a trumpet-shaped opening extending toward the lower end face thereof and many spun filaments are gathered in the filament-gathering nozzle. By this process, we succeeded in obtaining a multifilament type plastic optical fiber in which islands are arranged zigzag-stacked structure in the cross-section of the sea component.

According to this process, there can be obtained a multifilament type plastic optical fiber having a considerably good image-transmitting property, but although islands in the central portion of the multifilament type optical fiber's cross-section are arranged like zigzag-stacked structure, the cross-section structures of the islands are tetragonal to octagonal structures, and it is very difficult to increase the occupancy ratio of the cross-sectional area of the islands above 50% in the sectional area of the sea. Accordingly, a further improvement in the image-transmitting property is desired.

SUMMARY OF THE INVENTION

As the result of research made with a view to developing a plastic type multifilament optical fiber having a highly improved image-transmitting property, we have now completed the present invention.

More specifically, in accordance with the present invention, there is provided a multifilament type plastic optical fiber having a substantially rectangular cross-section and an islands-in-the-sea structure in which 100 to 10,000 islands are arranged in the sea, wherein respective islands have a substantially circular cross-section with a core-sheath structure, the islands are arranged in a zigzag-stacked structure, the occupancy ratio of the sum cross sectional areas of the light-transmitting cores is at least 50% of the cross-sectional area of the multifilament optical fiber, and the brightness index value I indicating the brightness of the transmitted image, which is defined by the formula (1) given hereinafter, is at least $4.5 \times 10^{-2}$.

DESCRIPTION OF THE PREFERRED EMBODIMENTS

Figure 1:
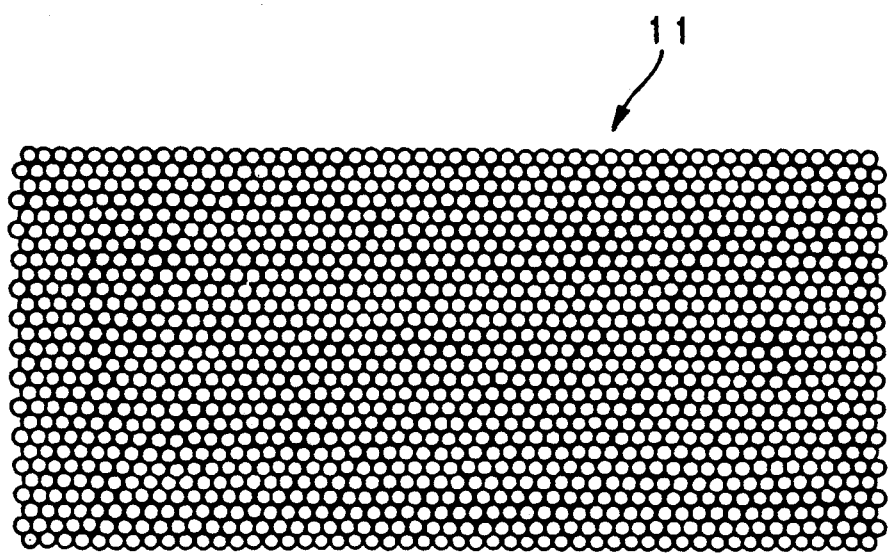
FIG. 1 is an enlarged view of across-section of an embodiment of the multifilament type plastic optical fiber of the present invention.

The brightness index I of the image transferred by the multifilament type optical fiber is defined by the following formula (1):

$$I = S \cdot NA^2 \cdot 10^{-(\frac{\alpha L}{10})} \quad (1)$$

wherein S is the occupancy ratio of cores in the multifilament type optical fiber's cross-section, $\alpha$ is the transmission loss (dB/m) per meter of the multifilament type optical fiber, NA is the numerical apertures, and L is the length (m) of the used multifilament type optical fiber.

The brightness index I of the multifilament type optical fiber of the present invention must be at least $4.5 \times 10^{-2}$, and the multifilament type optical fiber with the brightness index I of $5 \times 10^{-2}$ or more transfer the image having a very high brightness.

If the occupancy ratio of the total core cross-section in the plastic multifilament optical fiber cross-section is lower than 50%, the brightness index I of the transferred image by this optical filament is smaller than $4.5 \times 10^{-2}$, the brightness of the image transferred in the optical fiber is drastically reduced. Accordingly, the occupancy ratio of the total core crosssection in the optical fibers of the present invention should be at least 50%, preferably at least 55%, especially preferably at least 60%.

The numerical aperture NA is defined by the following formula (2), and this numerical aperture contributes to the brightness of the transferred image:

$$NA = \sqrt{n_1^2 - n_2^2} \quad (2)$$

wherein $n_1$ is the refractive index of the core-forming plastic material and $n_2$ is the refractive index of the sheath-forming plastic materials.

In the present invention, it is important that the difference between the refractive index $n_1$ of the core-forming polymer and the refractive index $n_2$ of the sheath-forming polymer in the islands be at least 0.01. In the case of a multifilament type optical fiber formed from a combination of polymers in which the value of $(n_1 - n_2)$ is smaller than 0.01, a phenomenon is observed in which light introduced into the core leaks into the sheath layer, and the brightness of the transferred image is drastically reduced.

Preferably, the core-forming polymer having the refractive index $n_1$ and the sheath-forming polymer having the refractive index $n_2$ is selected so that the numerical aperture NA defined by the formula (2) is at least 0.16, especially at least 0.3. In the case of a multifilament type optical fiber with the NA value of smaller than 0.16, the brightness index I is smaller than $4.5 \times 10^{-3}$ and a sharp image having a sufficient brightness cannot be transferred.

In the multifilament type optical fiber of the present invention, preferably the light transmission loss $\alpha$ is smaller than 3 dB/m, especially smaller than 1.3 dB/m. When the $\alpha$ value exceeds 3 dB/m, even if an island component having a large numerical aperture is used, it is difficult to realize a brightness index I of at least $4.5 \times 10^{-2}$ in the image transferred by the multifilament type optical fiber. In order to reduce the $\alpha$ value, preferably the polymer for the island component is purified, especially when the polymer is at the stage of the starting material.

In the formula (1), the value L indicates the used length (m) of the multifilament type optical fiber of the present invention. The value L is ordinarily 0.1 to 20.

The cross sectional structure of the islands in the multifilament type optical fiber of the present invention is substantially circular, the number of the islands, that is, the image elements, must be 100 to 10,000. If the number of the islands is too large, it is difficult to maintain a good uniformity in the obtained multifilament type optical fiber. In the case of a multifilament type optical fiber in which the number of islands is smaller than 100, the number of image elements is too small. In the present invention, preferably the number of islands in the multifilament type optical fiber is 150 to 5,000.

In order to increase the image resolution of the multifilament type plastic optical fiber, preferably the number of islands per unit sectional area of the sea is adjusted so that, when a converging lens and a lightreceiving face are disposed on both the ends of the optical fiber and a test pattern of a resolving power test target (USAF 1951) is transmitted by white light, the resolving power is at least 2 line pairs/mm where each line pair consists of one white line and one black line. In the case of a multifilament type plastic optical fiber having an island arrangement density such that the resolving power is less than 2 line pairs/mm, it is difficult to transfer an image with a good resolution. In the multifilament type plastic optical fiber of the present invention, preferably the island arrangement density is such that the resolving power is 5 to 30 line pairs/mm.

In order to obtain a multifilament type plastic optical fiber having a high resolution as described above, the cross-sectional shape must be substantially rectangular, as shown in FIG. 1. FIG. 1 is a cross-sectional view illustrating an embodiment of the multifilament type plastic optical fiber of the present invention, in which the number of islands is 1350 and the occupancy ratio of the total core cross-sectional area of the islands in the cross-sectional area of multifilament type optical fiber is at least 50%. In order to attain a cross-sectional area occupancy ratio of at least 50%, preferably both sides of the rectangular shape of the multifilament type optical fiber have a fine sine-curved structure as shown in FIG. 1.

If the cross-sectional shape of the multifilament type optical fiber is deviated from the rectangular shape, for example, to a shape resembling a circular shape, islands can be arranged in the packed stageered structure in the central portion of the cross-section of the multifilament type optical fiber, but this arrangement is disturbed in the peripheral portion and the cross-sectional shape of the islands is changed to a polygonal shape, with the result that the unevenness of the cross-sectional area in the islands becomes large and a multifilament type optical fiber capable of transferring a sharp image cannot be obtained.

Figure 2:
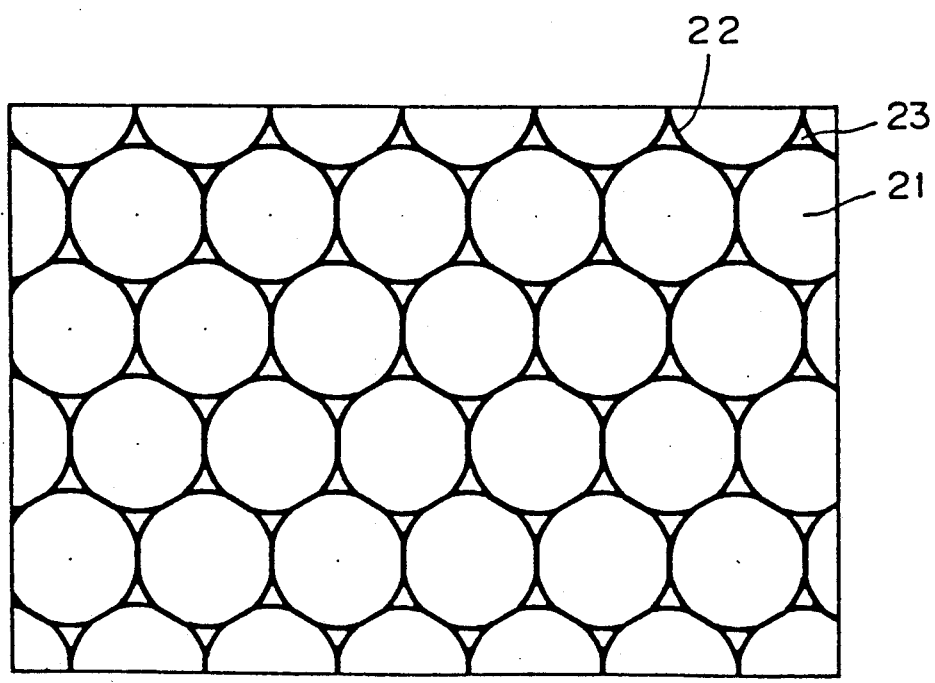
FIG. 2 is a partially enlarged view of the zigzag-stacked structure of the islands in the multifilament type plastic optical fiber's cross-section of the present invention.

In the multifilament type plastic optical fiber of the present invention, the islands must be arranged in the sea to form a zigzag-stacked structure as shown in the partially enlarged view of FIG. 2. In FIG. 2, reference numeral 21 represents the core section, reference numeral 22 represents the sheath, and reference numeral 23 represents the sea. By arranging the islands in the sea to form a zigzag-stacked structure as shown in FIG. 2, a multifilament type optical fiber having a high image element density and a high resolution can be provided.

Figure 3:
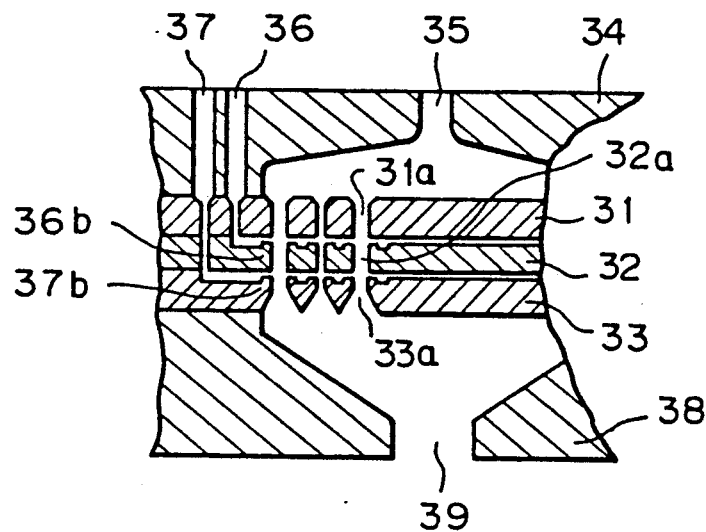
FIG. 3 is a cross-sectional view of a preferred embodiment of the conjugate spinneret for use in preparing the multifilament type optical fiber of the present invention.

FIG. 3 is a cross-sectional view illustrating an embodiment of the spinneret preferably used for the preparation of the multifilament type plastic optical fiber of the present invention. This spinneret is a conjugate spinning spinneret for the production of an islands-in-the-sea multifilament type optical fiber, which comprises four piled orifice plates, that is, an orifice plate 31 for forming cores, an orifice plate 32 for forming sheaths as the islands, an orifice plate 33 for forming the sea, and a filament-gathering orifice plate 38 to form adhered filaments.

Figure 4:
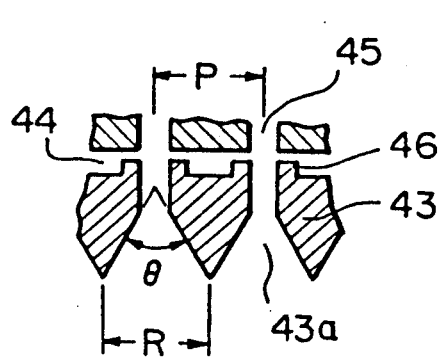
FIG. 4 is an enlarged view showing the shape of the conjugate spinning hole of an orifice plate for forming the sea.

In FIG. 4, reference numerals 31a, 32a and 33a represent a hole for spinning the core component, a hole for spinning the sheath component as the islands and a hole for spinning the sea component, respectively.

One of the characteristic features of this conjugate spinning spinneret resides in that the orifice plate is disposed just above the lowermost orifice plate, that is, the filament-gathering orifice plate 38. In short, the spinneret is characterized by the shape of the spinning hole 33a of the sea-forming orifice plate 33. This shape, as well as the neighbouring portion, is illustrated in the enlarged view of FIG. 4. In FIG. 4, reference numeral 43 represents a sea-forming orifice plate, and reference numeral 43a represents a hole for spinning the sea component and island component. As shown in FIG. 4, the hole 43a for spinning the sea component and island component is characterized in that the spinning hole 43a has a trumpet-shaped opening expanding toward the lower face of the sea-forming orifice plate, and it is especially preferable that the lower portion of the spinning hole 43a be a tapered hole expanded downwardly. Furthermore, preferably the lower end of the spinning hole defines the lower ends of the adjacent holes for spinning the sea component and island component.

Preferably, the spinning hole 43a is formed so that the relations of $R \geq P$, and especially $2P \geq R$, are established between the distance P between the centers of two adjacent holes and the diameter R of the lower end of the spinning hole 43a. Furthermore, preferably the relation of $R = \sqrt{P^2/3}$ is established. The angle $\theta$ of the trumpet-shaped opening of the spinning hole 43a should be in the range of $10° < \theta < 45°$.

If the above-mentioned orifice structure is adopted, molten polymers flow very smoothly at the joint point of the island component and sea component, and laminar flows of the island component and sea component are substantially maintained in this spinning hole, and thus a good circularity can be given to the section of the island component, with the result that the cross-sectional shape of the obtained multifilament type optical fiber is much more uniform than in the conventional product, as shown in FIG. 1.

Figure 5:
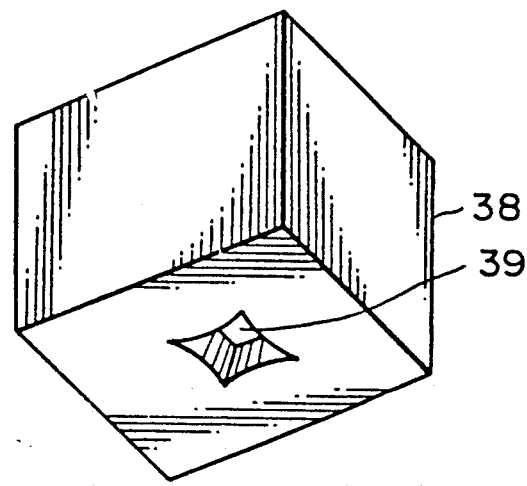
FIG. 5 is a perspective view showing the appearance of a filament-gathering orifice plate.

If the spinning hole of the sea-forming orifice has a trumpet-shaped opening extending to the lower end face of the orifice as described above, the islands-in-the-sea fiber in the thermally plasticized state separates from the sea-forming nozzle in a good condition without meandering or eccentricity. Accordingly, the occurrence of uneven fineness or insufficient circularity can be effectively prevented, and the uniformity of the islands-in-the-sea fiber can be greatly improved. If these many separate filaments are gathered by a filament-gathering orifice plate 38 having a substantially rectangular lower end, which has a cross-sectional shape as shown in FIG. 3 and an appearance as shown in FIG. 5, the intended multifilament type plastic optical fiber of the present invention having a substantially rectangular cross-section can be obtained. If an ordinary filament-gathering orifice plate having a lower end having a circular shape is used, the cross-sectional shape of the multifilament type optical fiber becomes substantially circular and the arrangement structure of islands in the section of the sea is deviated from the zigzag-stacked structure. Furthermore, the cross-sectional shape of the islands becomes polygonal rather than circular and a multifilament type plastic optical fiber capable of transferring an image at a high resolving power is difficult to obtain. Preferably, the filament-gathering hole on the lower end of the filament-gathering orifice plate has substantially a rectangular shape, especially a rectangular shape in which the sides are curved inward.

In order to prepare the multifilament type plastic optical fiber of the present invention at a high efficiency by using the above-mentioned conjugate spinning spinneret, preferably a spinning-drawing process is adopted in which the core component, sheath component and sea component are supplied to the respective nozzles, melt spinning is carried out under conditions such that the spinning draft D defined by the following formula (3) is at least 30:

$$D = (\text{hole diameter of spinning nozzle})^2/(\text{image element diameter of undrawn multifilament optical fiber})^2 \quad (3)$$

and drawing is then carried out at a temperature of 100° to 300° C. and a draw ratio of 1.05 to 5.0.

A multifilament type plastic optical fiber obtained by carrying out melt spinning at a spinning draft D lower than 30 is rigid and is easily broken, and it becomes necessary to reduce the speed of taking up the undrawn multifilament type optical fiber and, therefore, the shape-retaining stability of the filamentary polymer extruded from each nozzle hole is reduced. Therefore, in order to obtain a plastic type multifilament optical fiber having a good image transfer property, preferably spinning is carried out at a spinning draft D of 30 to 10,000.

Another important property required for the multifilament type optical fiber is transparency. Although the multifilament type optical fiber of the present invention comprises islands which are uniform and have a substantially circular cross-section, and have an excellent softness, an increase of the light transmission loss is not preferable. In order to impact a sufficient softness to the multifilament type plastic optical fiber, it is necessary to perform spinning at a high draft D. However, in this case, a drastic increase of the transmission loss is often observed in the obtained multifilament type optical fiber. In order to avoid this disadvantage, preferably the obtained undrawn multifilament type optical fiber is treated in the following manner.

Namely, in preparing a multifilament type plastic optical fiber comprising islands of the core-sheath structure arranged in the sea, spinning is carried out under conditions such that the spinning draft D defined by the formula (3) is at least 30, and the resulting undrawn multifilament type optical fiber is heat-drawn at a temperature of 100° to 200° C. at a draw ratio of 1.05 to 5.

Figure 6:
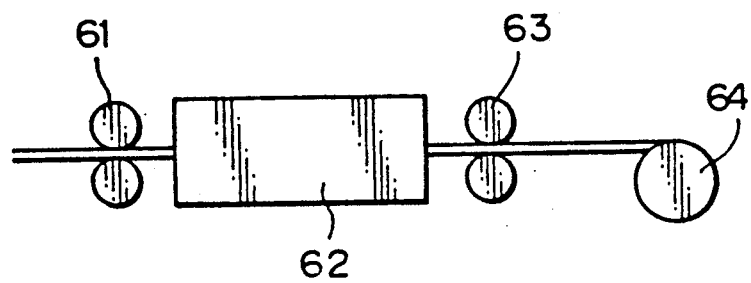
FIG. 6 is a diagram of a drawing step preferably used for efficiently preparing the multifilament type optical fiber of the present invention; and, FIG. 7 is a diagram of an apparatus for measuring the resistance against repeated bending in the multifilament type optical fiber, which was adopted in the examples given hereinafter.

FIG. 6 is a diagram of a drawing step preferably used for preparing the multifilament type plastic optical fiber of the present invention at a high efficiency. In FIG. 6, reference numeral 61 represents a take-up roller for an undrawn multifilament optical fiber extruded from the conjugate spinneret, reference numeral 62 represents a drawing heater, reference numeral 63 represents a drawing roller, and reference numeral 64 represents a winder.

As examples of the plastics for forming the core and sheath components of the multifilament type optical fiber of the present invention, there can be mentioned polymethyl methacrylate (n=1.49), a copolymer (n=1.47 to 1.50) composed mainly of methyl methacrylate, polystyrene (n=1.58), a copolymer (n=1.50 to 1.58) composed mainly of styrene, a styrene/acrylonitrile copolymer (n=1.56), poly-4-methylpentene-1 (n=1.46), an ethylene/vinyl acetate copolymer (n=1.46 to 1.50), a polycarbonate (n=1.50 to 1.57), polychlorostyrene (n=1.61), polyvinylidene chloride (n=1.63), polyvinyl acetate (n=1.47), a methyl methacrylate/styrene, vinyltoluene or α-methylstyrene/maleic anhydride terpolymer or quadripolymer (n=1.50 to 1.58), polydimethylsiloxane (n=1.40), polyacetal (n=1.48), polytetrafluoroethylene (n=1.35), polyvinylidene fluoride (n=1.42), polytrifluoroethylene (n=1.40), polyperfluoropropylene (n=1.34), fluoroethylene copolymers or terpolymers (n=1.35 to 1.40), a polyvinylidene fluoride/polymethyl methacrylate blend (n=1.42 to 1.46), copolymers composed mainly of a fluoromethacrylate represented by the general formula $CH_2=C(CH_3)COORf$ in which Rf stands for $(CH_2)_n(CF_2)_nH$ (n=1.37 to 1.42), $(CH_2)_m(CF_2)_nF$ (n=1.37 to 1.40), $CH-(CF_3)_2$ (n=1.38), $C(CF_3)_3$ (n=1.36), $CH_2CF_2CHFCF_3$ (n=1.40) or $CH_2CF(CF_3)_2$ (n=1.37), copolymers of these fluoromethacrylates (n=1.36 to 1.40), copolymers of such a fluoromethacrylate with methyl methacrylate (n=1.37 to 1.43), polymers composed mainly of a fluoroacrylate represented by the general formula

in which R'f stands for $(CH_2)_m(CF_2)_nF$ (n=1.37 to 1.40), $(CH_2)_m(CF_2)_nH$ (n=1.37 to 1.41), $CH_2CF_2CHFCF_3$ (n=1.41) or $CH(CH_3)_2$ (n=1.38), copolymers of these fluoroacrylate (n=1.36 to 1.41), copolymers of such a fluoroacrylate and a fluoromethacrylate as described above (n=1.36 to 1.41), copolymers of these fluoroacrylate and fluoromethacrylate and methyl methacrylate (n=1.37 to 1.43), and homopolymers and copolymers (n=1.37 to 1.42) composed mainly of a 2-fluoroacrylate represented by the general formula $CH_2=CF \cdot COOR''f$ in which R''f stands for $CH_3$, $(CH_2)_m(CF_2)_nF$, $(CH_2)_m(CF_2)_nH$, $CH_2CF_2CHFCF_3$ or $C(CF_3)_2$.

As examples of the plastics used as the sea component, there can be mentioned polyamides, polyester elastomers, polyamide elastomers, polystyrene elastomers, polyolefin elastomers, poly-4-methylpentene-1, poly-vinylidene fluoride, ionomers, ethylene/ethyl acrylate copolymers, ethylene/vinyl acetate copolymers, vinylidene fluoride copolymers, polymethyl methacrylate, poly-styrene, ABS, polybutylene terephthalate and poly-ethylene, and water-soluble polymers having a solubility of at least 10 g/l in warm water at 80° C., such as polyethylene glycol, polyvinyl alcohol, polyacrylamide, polyvinylpyrrolidone, and carboxymethyl cellulose. In order to obtain a multifilament optical fiber capable of transferring a sharp and bright image, preferably a polymer having a flowability larger than that of the sheath-forming polymer for forming islands at the spinning step is selected as the sea-forming polymer.

The present invention will now be described in detail with reference to the following examples.

Figure 7:
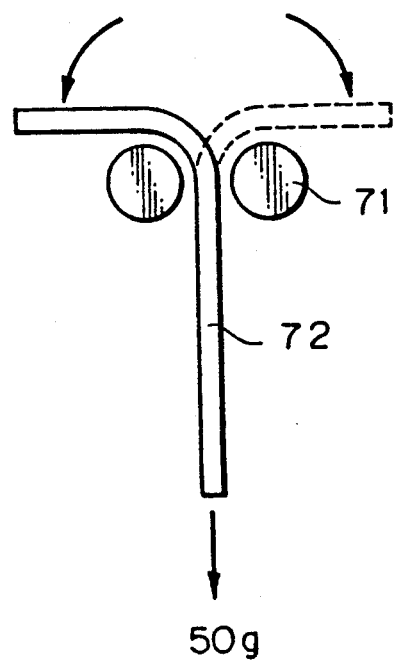

In the following examples, the softness was evaluated by measuring the resistance against repeated bending with an apparatus shown in FIG. 7. Referring to FIG. 7, the multifilament type optical fiber was repeatedly bent at a bending radius of 25 mm and a bending angle of 180°, and when the retention ratio of the quantity of transmitted light based on the initial value was lower than 80%, the number of bending repetitions was counted. In FIG. 7, reference numeral 71 represents a bending rod and reference numeral 72 represents a sample fiber.

EXAMPLE 1

Conjugate spinning was carried out by using a conjugate spinning spinneret having a structure as shown in FIG. 3, in which a filament-gathering orifice plate having a structure as shown in FIG. 5 and an angle $\theta_1$ of 15° was arranged. The hole number was as shown in Table 1. Polymethyl methacrylate having a refractive index of 1.492 was used as the core component constituting islands and a per-fluoroalkylmethacrylate polymer having a refractive index of 1.415 was used as the sheath component. Furthermore, polymethyl methacrylate was used as the sea component. A multifilament type plastic optical fiber having properties shown in Table 1 was obtained.

In each of multifilament type plastic optical fibers of Runs 1 through 6 in Table 1, islands were arranged in the zigzag-stacked structure shown in FIG. 1, and a sharp and fine image could be transferred and the brightness of the transferred image was very high. However, in the multifilament type optical fiber of Run 3, the transferred image was rough and the brightness of the transferred image was low.

TABLE 1

|  | Run 1 | Run 2 | Run 3 | Run 4 | Run 5 | Run 6 |
|---|---|---|---|---|---|---|
| Number of holes | 1350 | 1350 | 1350 | 1350 | 1350 | 2990 |
| Core diameter ($\mu$) | 10 | 20 | 20 | 50 | 80 | 10 |
| NA | 0.47 | 0.47 | 0.47 | 0.47 | 0.47 | 0.47 |
| $n_1-n_2$ | 0.077 | 0.077 | 0.077 | 0.077 | 0.077 | 0.077 |
| Core occupancy ratio (%) | 60 | 69 | 40 | 75 | 80 | 55 |
| Transmission loss (dB/m) | 1.3 | 1.1 | 1.1 | 1.0 | 0.85 | 1.6 |
| Length (m) of optical fiber | 2 | 3 | 3 | 5 | 5 | 2 |
| Brightness index I of optical fiber ($\times 10^{-2}$) | 7.2 | 7.1 | 4.1 | 5.2 | 6.6 | 5.8 |
| Cross-Sectional shape of multifilament type optical fiber | rectangular | rectangular | rectangular | rectangular | rectangular | rectangular |
| Arrangement structure of islands-in-the-sea | zigzag-stacked structure | zigzag-stacked structure | zigzag-stacked structure | zigzag-stacked structure | zigzag-stacked structure | zigzag-stacked structure |

EXAMPLE 2

A multifilament type optical fiber of the present invention having 1,350 image elements (islands in-the-sea) was prepared by carrying out conjugate spinning in the same manner as described in Example 1, by using the spinneret used for the multifilament type optical fiber of Run 5 in Table 1 of Example 1, polymethyl methacrylate having a refractive index of 1.492 as the core component, a vinylidene fluoride copolymer having a refractive index of 1.402 as the sheath component, and polymethyl methacrylate as the sea component.

In the obtained multifilament optical fiber, the core occupancy ratio was 80%, the sea occupancy ratio was 10%, the value NA was 0.51, the value of ($n_1-n_2$) was 0.09, the $\alpha$ value was 0.9 dB/m, and the value I was $7.4 \times 10^2$. A fine and sharp image having a high brightness could be transferred.

EXAMPLE 3

A multifilament type optical fiber having properties shown in Table 2 was prepared by carrying out conjugate spinning by using a spinneret having a sectional structure shown in FIGS. 3 through 5 and a hole number shown in Table 2, polymethyl methacrylate having a refractive index of 1.492 and a melt flow rate of 1.2 as the core-forming polymer, a fluoromethacrylate polymer having a refractive index of 1.415 and a melt flow rate of 6 as the sheath-forming polymer, and a vinylidene fluoride copolymer having a melt flow rate of 12 as the sea component.

As shown in Table 2, the multifilament type optical fiber of the present invention had a very good resolving power.

TABLE 2

|  | Run 7 | Run 8 | Run 9 | Run 10 |
|---|---|---|---|---|
| Number of holes | 2990 | 2990 | 1350 | 1350 |
| Arrangement structure of islands-in-the-sea | zigzag-stacked structure | zigzag-stacked structure | zigzag-stacked structure | zigzag-stacked structure |
| Sectional shape of islands | circular | circular | circular | circular |
| Cross-Sectional shape of multifilament type optical fiber | rectangular | rectangular | rectangular | rectangular |
| Resolving power (test target USAF 1951) (line pair/mm) | group 4, element 5 (25.39) | group 3, element 6 (14.3) | group 1, element 2 (2.24) | group 0, element 6 (1.78) |
| Transmission characteristic (sharpness of transferred image) | very sharp | very sharp | sharp | relatively obscure |
| Brightness index I of multifilament type optical fiber | $7.9 \times 10^{-2}$ | $10.8 \times 10^{-2}$ | $13.3 \times 10^{-2}$ | $15.1 \times 10^{-2}$ |
| Transmission loss (dB/m) | 2.3 | 1.6 | 0.91 | 0.70 |
| Core occupancy ratio (%) | 60 | 70 | 90 | 93 |
| fiber length (m) | 1 | 1 | 2 | 2 |
| island diameter ($\mu$) | 16 | 28 | 180 | 225 |

EXAMPLE 4

A multifilament type optical fiber was prepared by carrying out conjugate spinning under conditions shown in Table 3 by using a conjugate spinning nozzle shown in FIGS. 3 through 5, polymethyl methacrylate having a refractive index of 1.492 as the core-forming polymer, a fluoromethacrylate polymer having a refractive index of 1.415 as the sheath-forming polymer, and a vinylidene fluoride copolymer having a refractive index of 1.4020 as the sea-forming polymer. With respect to the obtained multifilament type optical fiber, the softness under repeated bending and the light-transmitting property expressed by the transmission loss were determined. The results are shown in Table 3. When the spinning draft defined by the formula (3) was at least 30, the prepared optical fiber had an excellent softness and when the spinning draft was at least 80, the softness was even greater. When the spinning draft was lower than 30, the light-transmitting property was good but it was difficult to transfer an image having a high resolution, and the obtained optical fiber had a poor softness.

TABLE 3

|  | Run 11 | Run 12 | Run 13 | Run 14 | Run 15 | Run 16 | Run 17 | Run 18 | Run 19 |
| --- | --- | --- | --- | --- | --- | --- | --- | --- | --- |
| Island diameter ($\mu$) | 10 | 25 | 60 | 100 | 125 | 180 | 350 | 215 | 350 |
| Number of islands | 1000 | 1000 | 250 | 250 | 250 | 250 | 100 | 250 | 100 |
| Spinning draft D | 4700 | 780 | 130 | 100 | 80 | 30 | 30 | 21 | 8 |
| Resistance against repeated bending (times) | above 1000 | above 1000 | above 1000 | above 1000 | above 1000 | 800 | 500 | 92 | 15 |
| Transmission loss (dB/m) | 3.0 | 2.3 | 2.5 | 1.8 | 1.86 | 1.43 | 0.65 | 0.82 | 0.36 |
| Brightness index I of multifilament type optical fiber ($\times 10^{-2}$) | 6.5 | 9.0 | 9.8 | 12.6 | 12.7 | 14.5 | 15.8 | 14.1 | 18.0 |
| Resolving power (line pair/mm) | 40.3 | 16.0 | 6.35 | 4.00 | 3.65 | 2.24 | 1.26 | 2.00 | 1.26 |
| Core occupance ratio (%) | 58 | 68 | 78 | 85 | 87 | 90 | 95 | 92 | 95 |
| fiber length (m) | 1 | 1 | 1 | 1 | 1 | 1 | 2 | 2 | 2 |

Multifilament type plastic optical fibers shown in Runs 11 through 17 of Table 3 were drawn under conditions shown in Table 4 by using the drawing apparatus shown in FIG. 6. The properties of the obtained multifilament type optical fibers are shown in Table 4.

TABLE 4

|  | Run 20 | Run 21 | Run 22 | Run 23 | Run 24 | Run 25 | Run 26 |
| --- | --- | --- | --- | --- | --- | --- | --- |
| Run in Table 3 | 11 | 12 | 13 | 14 | 15 | 16 | 17 |
| Drawing temperature (°C.) | 140 | 135 | 135 | 145 | 160 | 180 | 180 |
| Draw ratio | 1.05 | 1.5 | 1.5 | 1.5 | 1.5 | 2.0 | 3.0 |
| Transmission loss (dB/m) | 1.3 | 1.05 | 1.03 | 0.82 | 0.86 | 0.68 | 0.39 |

We claim:

1. A process for preparing a multifilament type plastic optical fiber, which comprises using an islands-in-the-sea type conjugate spinning spinneret comprising at least four orifice plates including a first orifice plate having 100 to 10,000 core-forming nozzle holes, a second orifice plate having a sheath-forming nozzle hole, said first and second orifice plate being stacked to form an island-forming orifice plate, and orifice plate having a sea-forming nozzle hole having a trumpet-shaped opening expanded toward the lower end thereof and an orifice plated having a filament-gathering hole having a substantially rectangular shape, supplying a core-forming polymer, a sheath-forming polymer and a sea-forming polymer to respective nozzle holes, spinning out many filaments having an islands-in-the-sea structure, and gathering and adhering the filaments at the filament-gathering orifice plate to obtain a multifilament optical fiber in which the core occupancy in a cross-sectional area of the multifilament type optical fiber is at least 50% and the brightness index value I indicating the brightness of a transmitted image is at least $4.5 \times 10^{-2}$.

2. A process for preparing a multifilament type plastic optical fiber according to claim 1, wherein the island in-the-seat type conjugate spinning spinneret is a non-pipe-implanted type spinneret having a sheath-forming polymer passage between the core-forming orifice plate and the sheath-forming orifice plate and a sea-forming polymer passage between the sheath-forming orifice plate and the sea-forming orifice plate.

3. A process for preparing a multifilament type plastic optical fiber according to claim 1, wherein the orifice plates satisfy the requirement of $2P \geq R \geq P$ in which P stands for the distance between the centers of two adjacent island-forming nozzle holes and R stands for the diameter of said lower end of the trumpet-shaped expanded opening of the sea-forming orifice plate.

4. A process for preparing a multifilament type plastic optical fiber comprising islands of a coresheath structure having a light-transmitting property, which are arranged in sea, said process comprising supplying respective component polymers to a spinning nozzle, and melt-spinning the polymers under conditions such that a spinning draft D is defined by the following formula (3):

$$D = \text{(hole diameter of spinning nozzle)}^2 / \text{(image element diameter of undrawn multifilament type optical fiber)}^2 \quad (3)$$

is at least 30, to obtain a multifilament type plastic optical fiber in which the island diameter is 10 to 200 $\mu$, the number of image elements is 100 to 10,000, said islands are arranged a zigzag-stacked structure in the sea, and section of the multifilament optical fiber has a substantially rectangular shape.

5. A process for preparing a multifilament type plastic optical fiber comprising islands of a core-sheath structure having a light-transmitting property, which are arranged in a sea, said process comprising supplying respective component polymers to a spinning nozzle, melt-spinning the polymers under conditions such that spinning draft D defined by the following formula (3):

$$D = \text{(hole diameter of spinning nozzle)}^2 / \text{(image element diameter of undrawn multifilament optical fiber)}^2 \quad (3)$$

is at least 30, and heat-drawing the undrawn filaments at a drawing temperature of 100° to 300° C. and a draw ratio of 1.05 to 5.0 to obtain a plastic multifilament type optical fiber in which the island diameter is 10 to 200$\mu$, the number of the islands is 100 to 10,000, the respective islands are arranged in a zigzag-stacked structure, and the cross-section of the multifilament type optical fiber has a substantially rectangular shape.

6. A process for preparing a multifilament type plastic optical fiber according to claim 5, wherein the draw ratio at the heat-drawing step is 1.05 to 5.0.

* * * * *